United States Patent [19]

Tanahashi et al.

[11] Patent Number: 4,795,009
[45] Date of Patent: Jan. 3, 1989

[54] TWIN-TUBE TYPE SHOCK ABSORBER

[75] Inventors: Haruhiko Tanahashi, Toyota; Makoto Hayashi, Aichi, both of Japan

[73] Assignee: Toyota Jidosha Kabushiki Kaisha, Aichi, Japan

[21] Appl. No.: 65,342

[22] Filed: Jun. 23, 1987

[30] Foreign Application Priority Data

Jul. 3, 1986 [JP] Japan .................. 61-101383

[51] Int. Cl.⁴ .............. F16F 5/00; F16F 9/36; F16F 9/14
[52] U.S. Cl. ................ 188/315; 188/322.17; 188/322.22; 267/64.15
[58] Field of Search .......... 188/269, 313, 315, 318, 188/322.11, 322.14, 322.15, 322.17, 322.22; 267/113, 124, 126, 127, 64.11, 64.13, 64.15; 280/708; 16/49, 66, 84, 51, 52; 92/152

[56] References Cited

U.S. PATENT DOCUMENTS

| | | | |
|---|---|---|---|
| 2,719,612 | 10/1955 | De Carbon | 188/322.17 X |
| 3,945,663 | 3/1976 | Duckett | 188/315 X |
| 4,054,277 | 10/1977 | Sirven | 188/318 X |
| 4,106,596 | 8/1978 | Hausmann | 188/269 X |
| 4,386,686 | 6/1983 | Miura | 188/322.17 |
| 4,407,396 | 10/1983 | Sirven | 188/282 |
| 4,438,834 | 3/1984 | Handke et al. | 188/315 X |

FOREIGN PATENT DOCUMENTS

| | | |
|---|---|---|
| 2545563 | 4/1976 | Fed. Rep. of Germany . |
| 2415752 | 8/1979 | France . |
| 53-70278 | 6/1978 | Japan . |
| 55-132432 | 10/1980 | Japan . |
| 61-14676 | 10/1981 | Japan . |

Primary Examiner—Andres Kashnikow
Assistant Examiner—Robert J. Oberleitner
Attorney, Agent, or Firm—Parkhurst, Oliff & Berridge

[57] ABSTRACT

The twin-tube type shock absorber wherein a piston-rod extends downward from a piston and penetrates a lower end portion of an outer shell. Pressurized gas in a reservoir chamber is positioned in an upper portion of the outer shell where the piston-rod does not penetrate the outer shell. Since a seal disposed between the piston-rod and the lower end portion of the outer shell is not exposed to the gas in the reservoir chamber, no gas leakage occurs through the portion where the piston-rod penetrates the outer shell. In addition, the piston-rod is connected to a member disposed on a wheel side of a suspension spring of a vehicle, so that vibrational characteristics of a vehicle body is improved and bubbling of a liquid in the outer shell is suppressed.

9 Claims, 6 Drawing Sheets

TWIN-TUBE TYPE SHOCK ABSORBER

BACKGROUND OF THE INVENTION

1. Field of the Invention

The present invention relates to a hydraulic twin-tube type shock absorber and specifically relates to an inverted twin-tube type shock absorber in which a piston-rod extends downward from a piston.

2. Description of the Prior Art

A hydraulic shock absorber composes one member of a suspension system for a vehicle and functions to damp the bound/rebound motion of a vehicle. Two typical types of hydraulic shock absorbers are known. One is a twin-tube type shock absorber, one example of which is disclosed in Japanese Pat. No. SHO 53-70278. The other type of shock absorber is a mono-tube type shock absorber, one example of which is disclosed in Japanese Pat. No. SHO 55-132432. The mono-tube type shock absorber of SHO 55-132432 is called D'carbon and SHO 55-132432 discloses an inverted use of a mono-tube type shock absorber in which a piston-rod thereof extends downward from a piston. Japanese Utility Model Publication No. SHO 61-14676 discloses another example of the inverted mono-tube type shock absorber, though the feature of the mono-tube type shock absorber of SHO 61-14676 is in the dust cover thereof. Since the mono-tube type shock absorber utilizes high pressure gas (e.g., a gas pressurized up to 20–30 $kg/cm^2$) to fill one portion of the reservoir chamber thereof, contact pressure between the piston-rod and an oil seal therefor which receives the high pressure of the gas via oil located in the chamber is very high and thus it is difficult to obtain smooth movement of the piston-rod. Conversely, movement of the piston-rod of a twin-tube shock absorber is smooth, because the twin-tube type shock absorber utilizes gas of low pressures. The present invention relates to the shock absorber of the former type, that is, of the twin-tube type for the purpose of obtaining smooth movement of the piston-rod.

Figure 6:
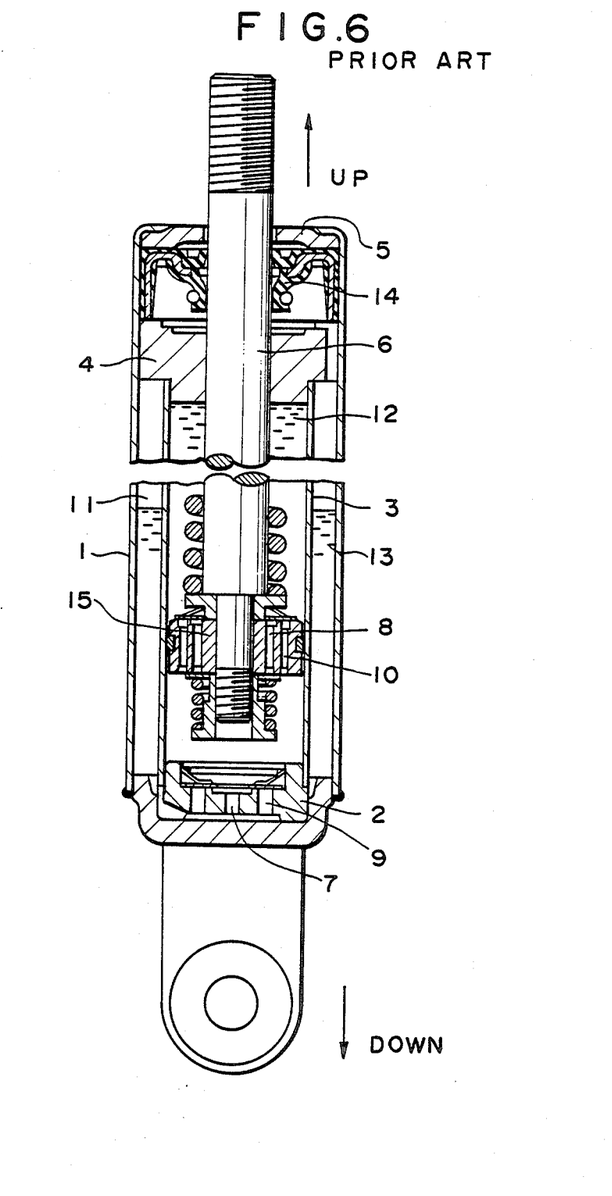
FIG. 6 is a sectional view of a conventional twin-tube type shock absorber disposed according to a conventional manner.

For the purpose of better understanding of the features of the twin-tube type shock absorber of the present invention, problems in a conventional twin-tube type shock absorber will be explained referring to FIG. 6. As shown in FIG. 6, a conventional twin-tube type shock absorber comprises an outer shell 1 and a cylinder 3 disposed within the outer shell 1. A space defined between the outer shell 1 and cylinder 3 is filled with gas 11 and oil 12 and composes a reservoir chamber 13. The reservoir chamber 13 is separated from a space inside of the cylinder 3 by a base valve which is fixed to lower end portion of the cylinder 3. The base valve 2 has a damping port 7 and a return port 9 and oil flowing through the damping port 7 generates a damping force under a compression stroke of the shock absorber. A piston 14 which is slidably inserted in the cylinder 3 divides the space inside the cylinder 3 into two chambers. The piston has a damping port 8 and a return port 10, and the oil flowing between the two chambers through the damping port 8 generates a damping force under a tension stroke of the shock absorber. A piston-rod 6 which is connected to the piston 15 penetrates a rod guide 4 connected to an upper end portion of the cylinder 3 and an upper end plate 5 of the outer shell 1. An upper end portion of the piston-rod 6 is connected to a portion of the body of a vehicle.

The conventional twin-tube type shock absorber of FIG. 6 has the following problems.

First, the surface of the oil in the reservoir chamber 13 is easily inclined due to an inertia force acting on the oil and the gas 11 in the reservoir chamber 13 can easily flow into the chamber inside the cylinder 3. To prevent the gas from flowing from the reservoir chamber 13 into the chamber inside cylinder 3, it is necessary to provide a special check seal mechanism at the base valve 2.

Second, since the oil in the reservoir chamber 13 is vibrated by the outer shell 1 which is connected to wheel side members, the surface of the oil bubbles to a great extent corresponding to severe vertical movements of wheels, and the bubbles of gas will easily flow into the chamber inside the cylinder 3. To prevent the bubbles of gas from flowing into the chamber inside cylinder 3, it is necessary to provide a special means for suppressing bubbling of the surface of the oil, such as a free piston or some bubble suppressing material mixed in the oil.

Third, since the oil seal 14 is exposed directly to the gas 11 in the reservoir chamber 13, the gas 11 in the reservoir chamber 13 gradually leaks outside the shock absorber during the life of the shock absorber through the portion where the piston-rod 6 extends through the oil seal 14, whereby the surface of the oil is gradually lowered and the damping abililty of the shock absorber is gradually decreased. To prevent such gas leakage, it becomes necessary to provide a special check seal mechanism, such as a special oil collecting means, in the seal member 14 itself.

Fourth, since a considerably large area of the surface of the outer shell 1 contacts the gas 11 in the reservoir chamber 13, the heat disipating ability of the shock absorber is not good and deterioration of the oil will easily occur.

Finally, since the entire portion of the shock absorber excluding the piston-rod 6 is connected to a member which is disposed on the wheel side of a suspension spring of the suspension system, the mass of vehicle members on the wheel side of the suspension spring is increased and the vibrational characteristics of the vehicle body are negatively affected. In addition, as previously mentioned, since the outer shell 1 of the shock absorber directly receives rapid vertical movements of the wheels, the oil is vibrated by the outer shell 1 and bubbling at the surface of the oil is increased.

OBJECT AND SUMMARY OF THE INVENTION

An object of the invention is to provide a twin-tube type shock absorber in which no gas leakage occurs and almost all portions of the shock absorber except the piston-rod are connected to members disposed on the vehicle body side of a suspension spring of a suspension system of a vehicle.

The above object is achieved by the following twin-tube type shock absorber according to the present invention.

A twin-tube type shock absorber comprising:

an outer shell so disposed as to extend in a substantially vertical direction, the outer shell having an end plate at an upper end portion thereof and a seal retainer at a lower end portion thereof;

a cylinder disposed co-axially with the outer shell within the outer shell, an outside surface of the cylinder being radially spaced from an inside surface of the outer shell, the cylinder extending downward from a vertically intermediate portion of the outer shell to a vicinity of the seal retainer;

a base valve connected to an upper end portion of the cylinder, the base valve having a first damping port, a first return port and a first communication path which are formed in the base valve, respectively;

a rod guide connected to a lower end portion of the cylinder and positioned on an upper side of the seal retainer, the rod guide having a second communication path which is formed in the rod guide;

a piston slidably housed in the cylinder, the piston having a second damping port and a second return port formed in the piston;

a piston-rod connected to the piston, the piston-rod extending downward from the piston and slidably penetrating the rod guide and the seal retainer; and a seal supported by the seal retainer and disposed between the piston-rod and the seal retainer, the outer shell and the base valve defining a first chamber, an upper portion of which is filled with gas and a lower portion of which is filled with liquid, the first chamber composing a main chamber of a reservoir chamber, the cylinder, the base valve and the piston defining a second chamber which is filled with liquid, the second chamber being fluidly connected to the first chamber via the first damping port and the first return port, the cylinder, the piston and the rod guide defining a third chamber which is filled with liquid, the third chamber being fluidly connected to the second chamber via the second damping port and the second return port, the outer shell, the cylinder, the base valve and the rod guide defining a fourth chamber which is filled with liquid, the fourth chamber being fluidly connected to the first chamber via the first communication path, the fourth chamber composing a sub-chamber of the reservoir chamber, the rod guide and the oil seal retainer defining a fifth chamber which is filled with liquid, the fifth chamber being fluidly connected to the fourth chamber via the second communicating path.

In the twin-tube type shock absorber of the present invention, the main chamber of the reservoir chamber which includes gas therein is positioned at an upper portion of the shock absorber and the piston-rod extends downward. As a result, the portion where the piston-rod penetrates the wall of the shock absorber is not exposed to the gas of the reservoir chamber and no gas leakage through the penetrating portion occurs. In addition, since only the mass of the piston-rod of the shock absorber is added to the total mass of the vehicle members on the wheel side of the suspension spring, the vibrational characteristics of the vehicle body are not seriously affected by the addition of the shock absorber. In addition, since the outer shell is connected to the vehicle body, movement of the outer shell is suppressed and bubbling of the surface of the oil is also suppressed.

BRIEF DESCRIPTION OF THE DRAWINGS

These and other objects and advantages of the present invention will become more apparent and more readily appreciated from the following detailed description of the preferred exemplary embodiments of the invention taken in conjunction with the accompanying drawings, in which.

DETAILED EXPLANATION OF THE PREFERRED EMBODIMENTS

Figure 1:
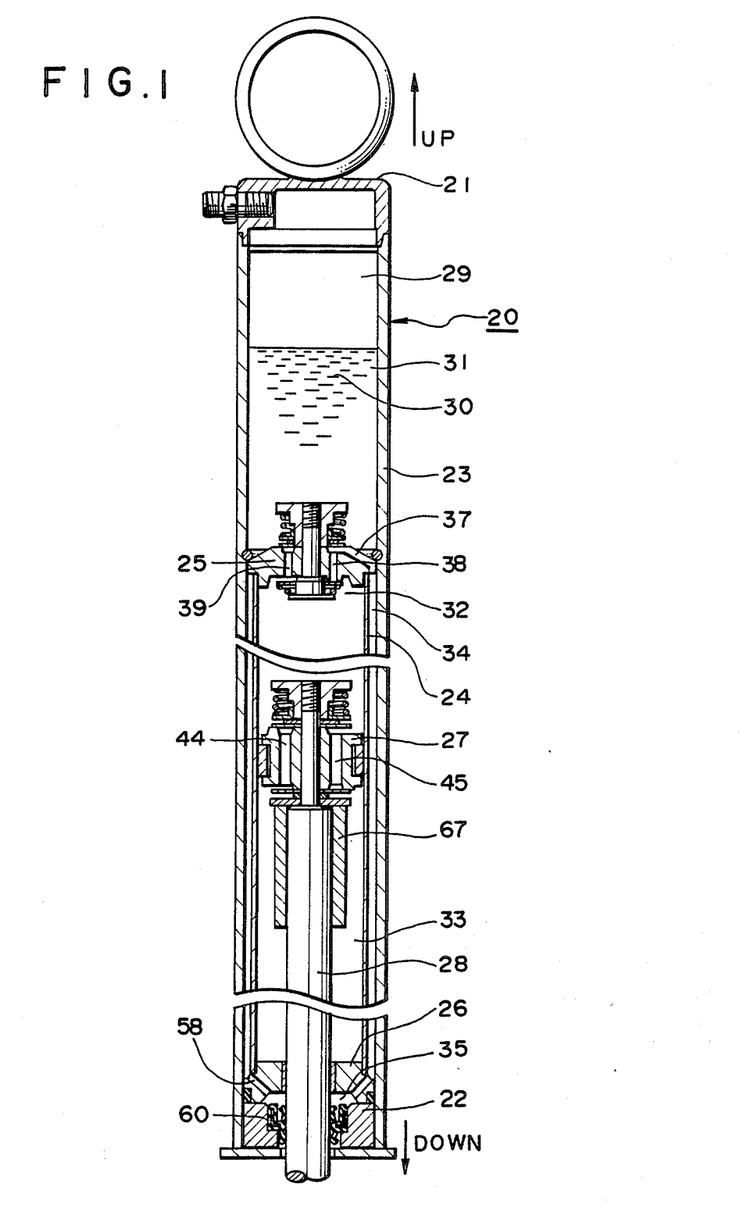
FIG. 1 is a sectional view of a twin-tube type shock absorber according to one embodiment of the present invention.

FIG. 1 illustrates an entire section of a twin-tube type shock absorber 20 according to one embodiment of the present invention. The shock absorber 20 comprises an outer shell 23, a cylinder 24, a base valve 25, a rod guide 26, a piston 27, a piston-rod 28, and a seal 60.

The outer shell 23 extends in a substantially vertical direction which may be an absolutely vertical direction or a vertical direction which is oblique to the absolutely vertical direction. The outer shell 23 has an end plate 21 at an upper end portion thereof and a seal retainer 22 at a lower end portion thereof.

The cylinder 24 is disposed within the outer shell 23. An outside diameter of the cylinder 24 is smaller than the inside diameter of the outer shell 23 and the cylinder 24 is disposed within the outer shell 23 such that an annular space is formed between an outside surface of the cylinder 24 and an inside surface of the outer shell 23 in the radial direction. The cylinder 24 extends downward from a vertically intermediate portion of the outer shell 23 to a portion proximate the seal retainer 22. The outer shell 23 and the cylinder 24 together constitute a twin-tube.

The base valve 25 is connected to an upper end portion of the cylinder 24. The radially outside surface of the base valve 25 is fixed to the inside surface of a vertically intermediate portion of the outer shell 23. A first damping port 39, a first return port 38, and a first communication path 37 are formed in the base valve 25.

The rod guide 26 is connected to an lower end portion of the cylinder 24. The rod guide 26 is positioned proximate the seal retainer 22 and on the upper side of the seal retainer 22. A second communication path 58 is formed in the rod guide 26.

The piston 27 is slidably housed in the cylinder 24 and the radially outside surface of the piston 27 slidably contacts the inside surface of the cylinder 24. A second damping port 44 and a second return port 45 are formed in the piston 27.

The piston-rod 28 is connected to the piston 27 and moves together with the piston 27. The piston-rod 28 extends downward from the piston 27 and slidably penetrates the rod guide 26 and the seal retainer 22.

The seal 60, a main portion of which is made of rubber, is supported by the seal retainer 22. The seal 60 is disposed between the piston-rod 28 and the seal retainer 22 and the piston-rod 28 slidably contacts the seal 60.

The outer shell 23 and the base valve 25 define a first chamber 31 which is located above the base valve 25. The upper portion of the first chamber 31 is filled with gas and the lower portion of the first chamber 31 is filled with liquid. The first chamber 31 composes a main chamber of a reservoir chamber of the shock absorber 20.

The cylinder 24, the base valve 25 and the piston 27 define a second chamber 32 located below the base valve 25 and above the piston 27. The second chamber 32 is filled with liquid and is fluidly connected to the first chamber 31 via the fist damping port 39 and the first return port 38.

The cylinder 24, the piston 27 and the rod guide 26 define a third chamber 33 located below the piston 27 and above the rod guide 26. The third chamber 33 is filled with liquid and is fluidly connected to the second chamber 32 via the second damping port 44 and the second return port 45.

The outer shell 23, the cylinder 24, the base valve 25 and the rod guide 26 define a fourth chamber 34 located between the outer shell 23 and the cylinder 24, and below the base valve 25 and above the rod guide 26. The fourth chamber 34 is filled with liquid and is fluidly connected to the first chamber 31 via the first communication path 37 formed in the base valve 25. Thus, the fourth chamber 34 constitutes a sub-chamber of the reservoir chamber of the shock absorber 20.

The rod guide 26 and the seal retainer 22 define a fifth chamber 35 located below the rod guide 26 and above the seal retainer 22. The fifth chamber 35 is filled with liquid and is fluidly connected to the fourth chamber 34 via the second communication path 58 formed in the rod guide 26.

A liquid 30 is filled within the outer shell 23 except the upper portion of first chamber 31. The amount of the liquid 30 to be inserted is determined to be such that the level of the liquid 30 is never below the upper surface of the base valve 25. (The level of the liquid 30 is lowest at the most extended stroke of the shock absorber 20.) The liquid 30 preferably comprises oil.

The pressure of the gas 29 filled in the upper portion of the first chamber 31 is always less than 20 kg/cm$^2$, for example, 3-6 kg/cm$^2$, and the pressure is usually far lower than the pressure (20-30 kg/cm$^2$) of the gas filled in a conventional mono-tube type shock absorber. The low pressure of the gas 29 decreases the pressure which acts on the seal 60 via the liquid 30 and makes sliding of the piston-rod 28 with respect to the seal 60 very smooth.

The outer shell 23 is connected to a member disposed on the body side of a suspension spring of the vehicle suspension system and the piston-rod 28 is connected to a member disposed on the wheel side of the suspension spring of the suspension system of the vehicle. As a result of this arrangement, the mass of members below the spring of the vehicle suspension system is not significantly increased by he shock absorber and the liquid 30 within the shock absorber 20 is not substantially vibrated. Accordingly, the damping characteristics of the suspension system will be improved and bubbling of the surface of the liquid 30 will be suppressed.

Figure 4:
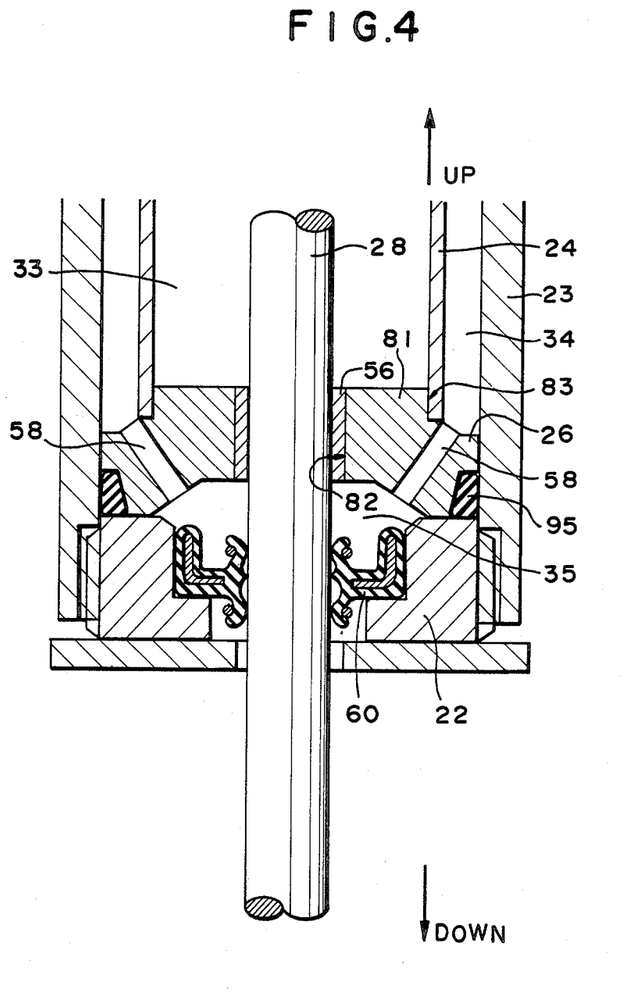
FIG. 4 is a sectional view of the rod guide and surrounding portions of the shock absorber of FIG. 1.
Figure 5:
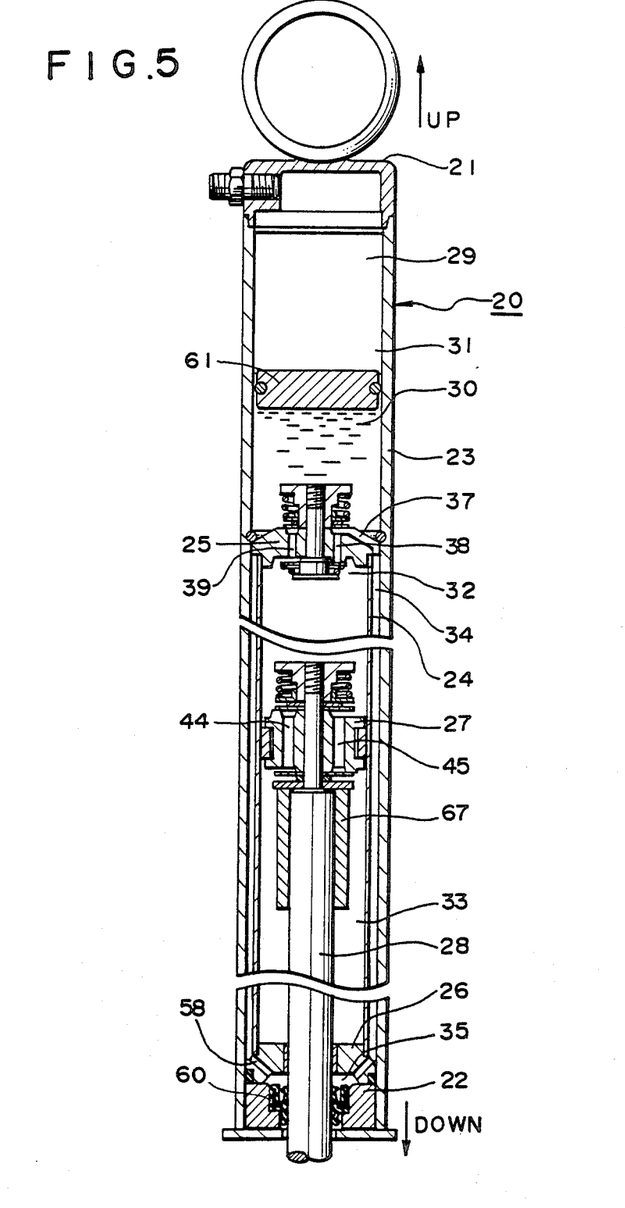
FIG. 5 is a sectional view of a twin-tube type shock absorber according to another embodiment of the present invention.

As shown in FIG. 5, if further suppression of bubbling of the surface of the liquid is required, a free piston 61 can be housed in the first chamber 31. In the embodiment of FIG. 5, the free piston 61 is so inserted in the outer shell 23 as to be slidable with respect to the outer shell 23. The free piston 61 separates the gas 29 from the liquid 30 in the first chamber 31. The structure of the shock absorber of FIG. 5 is the same as that of the shock absorber of FIG. 2 except the provision of the free piston 61. Accordingly, explanation of the shock absorber 20 of FIGS. 1 to 4 is applicable to both the structure of FIG. 1 and the structure of FIG. 5.

Figure 2:
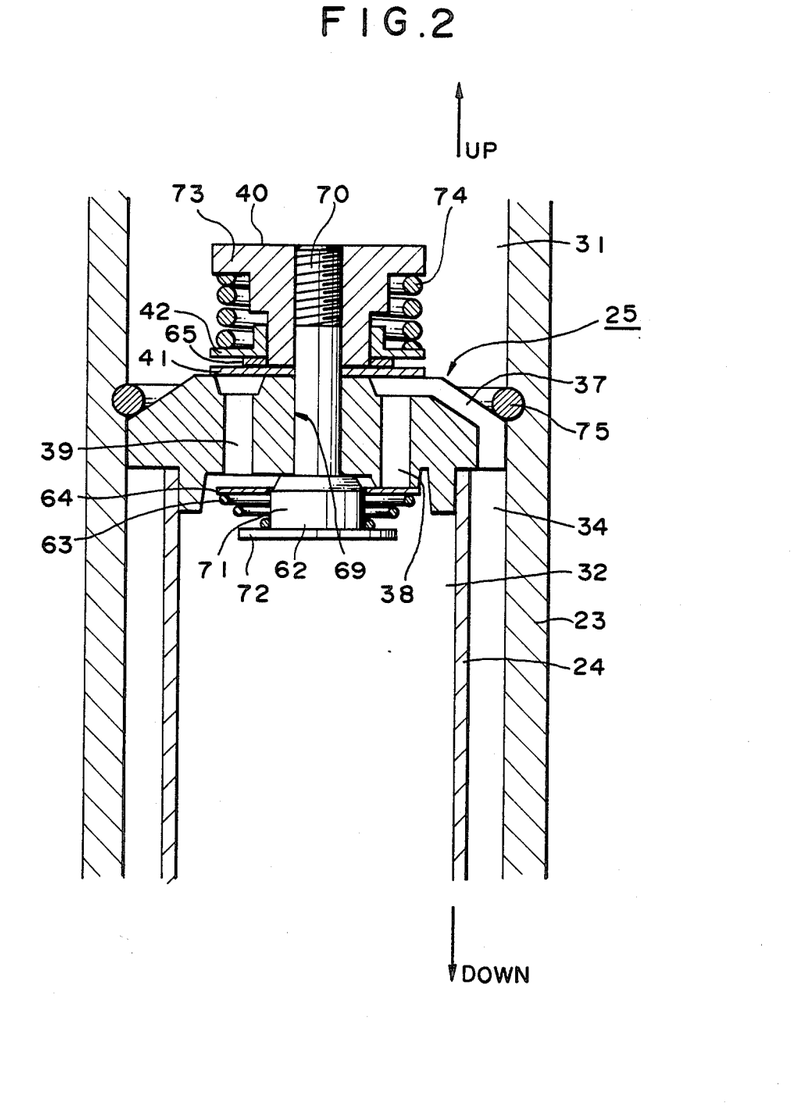
FIG. 2 is a sectional view of the base valve and surrounding portions, of the shock absorber of FIG. 1.

FIG. 2 illustrates the details of the base valve 25 and portions of the shock abosorber in the vicinity thereof. As shown in FIG. 2, a valve guide 62 extends on an axis of the base valve 25 and extends through a center hole 69 formed in the base valve 25. A screw 70 is formed on an upper portion of the valve guide 62. A lower portion of the valve guide 62 is radially expanded and a lowermost portion of the expanded portion 71 extends radially outward and forms a first flange portion 72. An upper surface of the expanded portion 71 contacts a lower surface of a radially inner portion of the base valve 25.

A base valve nut 40 is fixedly threaded onto the screw 70 formed in the upper portion of the valve guide 62. An uppermost portion of the base valve nut 40 is radially expanded and forms a second flange portion 73.

A first leaf valve 41 constructed of an annular elastic plate is disposed on an upper side of the base valve 25. A radially inner portion of the first leaf valve 41 is squeezed between the base valve 25 and the base valve nut 40. A radially outer portion of the first leaf valve 41 detachably contacts the upper surface of the base valve 25 so as to close or open the first damping port 39 through elastic deformation of the first leaf valve 41.

A first leaf seat 65 constructed of an annular plate is disposed on an upper side of the first leaf valve 41 so as to support a radially intermediate portion of the first leaf valve 41 from the upper side of the first leaf valve 41. The first leaf seat 65 is disposed radially outside a lower portion of the base valve nut 40 so as to be slidable with respect to the lower portion of the base valve nut 40.

A first spring seat 42 constructed of an annular member with a L-shaped cross section is disposed on an upper side of the first leaf seat 65 so as to contact an upper surface of the first leaf seat 65 and so as to push the first leaf seat 65 downward. The first spring seat 42 is disposed radially outside the lower portion of the base valve nut 40 so as to be slidable with respect to the lower portion of the base valve nut 40.

A first compression spring 74 is interposed between the first spring seat 42 and the second flange portion 73 of the base valve nut 40. The first compression spring 74 biasses the first spring seat 42 downward.

A first non-return valve 64 constructed of an annular plate is disposed on a lower side of the base valve 25. The first non-return valve 64 is disposed radially outside the expanded portion 71 of the valve guide 62 so as to be slidable with respect to the expanded portion 71 of the valve guide 62 and the first non-return valve 64 detachably contacts the lower surface of the base valve 25.

A second compression spring 63 comprising a conical spring is disposed between the first non-return valve 64 and the first flange portion 72 of the valve guide 62. The first non-return valve 64 is slidable with respect to the expanded portion 71 of the valve guide 62 so as to open or close the first return port 38 through compression of the second compression spring 63.

Fixed spaces are provided between a lower end portion of the first damping port 39 and the first non-return valve 64, and between an upper end portion of the first return port 38 and the first leaf valve 41, respectively. The position of the base valve 25 in the vertical direction is determined by a ring 75 which is fixedly fitted in a groove formed in the outer shell 23.

Figure 3:
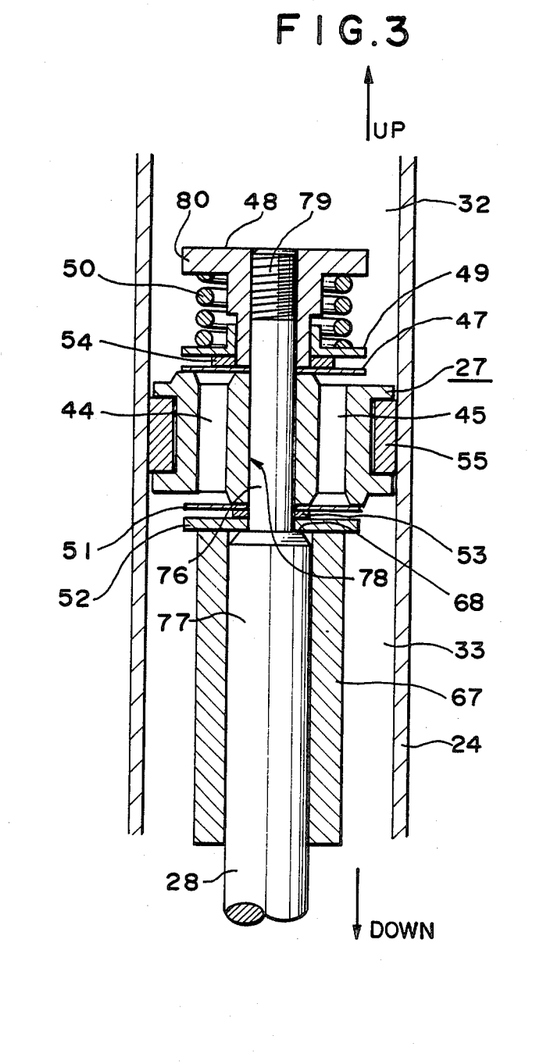
FIG. 3 is a sectional view of the piston and surrounding portions of the shock absorber of FIG. 1.

FIG. 3 illustrates the details of the piston 27 and portions of the shock absorber in the vicinity thereof. As shown in FIG. 3, the piston-rod 28 has a step portion 68. The diameter of a first portion 76 of the piston-rod 28 above the step portion 68 is smaller than the diameter of a second portion 77 of the piston-rod 28 below the step portion 68. The first portion 76 of the piston-rod 28 extends through a center hole 78 formed in the piston 27. A screw 79 is formed on an upper portion of the first portion 76 of the piston-rod 28.

A piston nut 48 is fixedly threaded onto the screw 79 formed in the upper portion of the first portion 76 of the piston-rod 28. An uppermost portion of the piston nut 48 is radially expanded and forms a third flange portion 80.

A second leaf valve 47 constructed of an annular elastic plate is disposed on an upper side of the piston 27. A radially inner portion of the second leaf valve 47 is squeezed between the piston 27 and the piston nut 48. A radially outer portion of the second leaf valve 47 detachably contacts an upper surface of the piston 27 so as to close or open the second damping port 44 through elastic deformation of the second leaf valve 47.

A second leaf seat 54 constructed of an annular plate is disposed on an upper side of the second leaf valve 47 so as to support a radially intermediate portion of the second leaf valve 47 from the upper side of the second leaf valve 47. The second leaf seat 54 is disposed radially outside a lower portion of the piston nut 48 so as to be slidable with respect to the lower portion of the piston nut 48.

A second spring seat 49 constructed of an annular member with a L-shaped cross section is disposed on an upper side of the second leaf seat 54 so as to contact an upper surface of said second leaf seat 54 and so as to bias the second leaf seat 54 downward. The second spring seat 49 is disposed radially outside the lower portion of the piston nut 48 so as to be slidable with respect to the lower portion of the piston nut 48.

A third compression spring 50 is interposed between the second spring seat 49 and the third flange portion 80 of the piston nut 48. The third compression spring 50 biasses the second spring seat 49 downward.

A second non-return valve 51 constructed of an annular elastic plate is disposed on a lower side of the piston 27. The second non-return valve 51 is disposed radially outside the first portion 76 of the piston-rod 28 and detachably contacts a lower surface of the piston 27. The second non-return valve 51 is elastically deformable so as to open or close the second return port 45 by elastic deformation of the second non-return valve 51.

A third leaf seat 53 constructed of an annular plate is disposed on a lower side of the second non-return valve 51 so as to support a radially inner portion of the second non-return valve 51 from the lower side of the second non-return valve 51. The third leaf seat 53 is disposed radially outside the first portion 76 of the piston-rod 28.

A non-return valve stopper 52 constructed of an annular plate is disposed on a lower side of the third leaf seat 53. A radially inner portion of the non-return valve stopper 52, the third leaf seat 53 and a radially inner portion of the second non-return valve 51 are squeezed between a radially inner portion of the piston 27 and the step portion 68 of the piston-rod 28.

Fixed spaces are provided between a lower end portion of the second damping port 44 and the second non-return valve 51, and between an upper end portion of the second return port 45 and the second leaf valve 47, respectively.

A piston-ring 55 is fitted in a circumferential groove formed in a radially outer portion of the piston 27. The piston-ring 55 slidably contacts an inside surface of the cylinder 24. Reference numeral 67 illustrates a stopper which restricts excessive movement of the piston 27 by hitting the rod guide 26.

FIG. 4 illustrates the details of the rod guide 26 and portions of the shock absorber in the vicinity thereof. The rod guide 26 comprises a rod guide main body 81 having a center hole 82 and a cylindrical guide bush 56 fixedly fitted in the center hole 82 of the rod guide main body 81. The piston-rod 28 slidably contacts an inside surface of the guide bush 56. The cylinder 24 is fixedly connected to a step-like shoulder 83 formed in an upper and radially outer portion of the rod guide main body 81. The second communication path 58 is obliquely formed in a radially outer portion of the rod guide main body 81 so as to communicate the fourth chamber 34 with the fifth chamber 35. A step-like groove is formed in a lower and radially outer portion of the rod guide 26 and a fixed sealing member 95 is inserted in a space defined by the rod guide 26, the seal retainer 22 and the outer shell 23.

The operation of the twin-tube shock absorber 20 will be explained hereinafter.

The shock absorbing function of the shock absorber 20 is substantially similar to that of the conventional twin-tube type shock absorber.

Under bounding motion, that is, under a compression stroke of the shock absorber 20, when the piston 27 and the piston-rod 28 move rapidly upward with respect to the cylinder 24, the pressure of the second chamber 32 becomes high. The pressurized liquid in the second chamber 32 pushes the first leaf valve 41 provided at the base valve 25 upward and the fluid flows through the first damping port 39 into the first chamber 31. The liquid which tends to flow toward the lower side of the piston 27 pushes the second non-return valve 51 provided at the piston 27 downward and flows through the second return port 45 into the third chamber 33. The flow resistance which is generated on the base valve 25 side provides the damping force of the shock absorber 20 under the compression stroke.

Under rebounding motion, that is, under a tension stroke of the shock absorber 20, when the piston 27 and the piston-rod 28 move rapidly downward with respect to the cylinder 24, the first non-return valve 64 provided at the base valve 25 is moved downward due to the pressure difference between the first chamber 31 and the second chamber 32 and the liquid flows from the first chamber 31 through the first return port 45 into the second chamber 32. Since the pressure of the third chamber 33 becomes high, the liquid in the third chamber 33 deforms the second leaf valve 47 provided at the piston 27 upward and flows from the third chamber 33 through the second damping port 44 into the second chamber 32. The flow resistance which is generated on the piston 27 side provides the damping force of the shock absorber 20 under the tension stroke.

Either under a compression stroke or under a tension stroke, the gas 29 in the first chamber 31 is maintained at the upper portion of the first chamber 31 where the piston-rod 28 does not penetrate the wall of the shock absorber 20. The portion where the piston-rod 28 penetrates the wall of the shock absorber 20 is always filled with the liquid. In addition, the low pressure of the gas is always transmitted to the seal 60 via the liquid in the first chamber 31, the liquid in the fourth chamber 34, and the liquid in the fifth chamber 35 which are communicated with each other by the first communication path 37 and the second communication path 58.

While, the twin-tube type shock absorber 20 of the present invention is similar to an inverted conventional twin-tube type shock absorber of the type shown in FIG. 6, the twin-tube type shock absorber 20 of the present invention is not a mere inverted use of the conventional twin-tube type shock absorber of FIG. 6. The twin-tube type shock absorber 20 of the present invention differs from a hypothetical twin-tube type shock absorber corresponding to an inverted use of the conventional twin-tube type shock absorber of FIG. 6 in the following points. The main chamber (the first chamber 31) of the reservoir chamber of the former is of a large volume, while that of the latter is of a small volume. The gas 29 is always positioned in the upper portion of the first chamber 31 in the former, while the gas will be positioned in all three of the reservoir chamber, the space between the end plate and the base plate and the space between base plate and the piston in the latter. This means that the function of the base valve of the latter will be deteriorated. Accordingly, inversion of the conventional twin-tube shock absorber is not practical.

The twin-tube type shock abosorber 20 also differs from the conventional inverted mono-tube shock absorber in that pressure of the gas 29 of the former is far lower than that of the latter.

According to the present invention, the following effects are obtained.

First, since the seal 60 is not exposed to the gas in the first chamber 31 and always contacts the liquid, slow leakage of the gas 29 through the portion where the piston-rod 28 penetrates the wall of the outer shell 23 does not occur through the life of the shock absorber 20. This also means that no level down of the liquid 30 occurs in the shock absorber 20 of the present invention. Thus, the reliability and durability of the shock absorber 20 is increased.

Second, since the all members of the shock absorber 20 except the piston-rod 28 which extends downward from the piston 27 are connected to a member disposed on the vehicle side of a suspension spring of a vehicle, the increase in the mass of the members disposed on the wheel side of the suspension spring of the vehicle is kept to a minimum. This improves the vibrational characteristics of the members disposed on the body side of the suspension spring and also suppresses bubbling of the liquid 30 in the shock absorber 20, because movements of the outer shell 23 and the inner shell 24 are substantially independent of rapid movements of the piston-rod 28 which moves with the wheels of the vehicle. As a result, the flow of bubbles of gas from the reservoir chamber (the first chamber 31) into the second chamber 32 is suppressed and good initial damping characteristics of the shock absorber 20 are maintained. Moreover, if the free piston 61 of FIG. 5 is provided, bubbling will be further suppressed.

Third, since the rod guide 26 does not contact the gas 29 in the reservoir chamber (the first chamber 31), no gas flow occurs between the third chamber 33 and the fourth chamber 34 thus maintaining the damping characteristics of the shock absorber 20.

Fourth, since the gas 29 is collected in the upper portion of the outer shell 23, the area of the portion of the outer shell 23 where the outer shell 23 contacts the gas 29 is small, thus the heat dissipating ability of the shock absorber 20 of the present invention is very high.

Finally, since the pressure of the gas 29 is lower than that of the conventional mono-tube type shock absorber, the pressure acting on the seal 60 which slidably contacts the piston-rod 28 is small and good sliding of the piston-rod 28 with respect to the seal 60 is obtained, while such good sliding can not be obtained in the mono-tube type shock absorber. Additionally, there is less abrasion of the rubber of the seal 60 and the life of the seal 60 is lengthened.

Although only a few exemplary embodiments of the present invention have been described in detail above, those skilled in the art will readily appreciate that many modifications are possible in the exemplary embodiments without materially departing from the novel teachings and advantages of the invention. Accordingly, all such modifications are intended to be included within the scope of the present invention as defined in the following claims.

What is claimed is:

1. A twin-tube type shock absorber comprising:

an outer shell disposed so as to extend in a substantially vertical direction, said outer shell having an end plate at an upper end portion thereof and a seal retainer at a lower end portion thereof;

a cylinder disposed co-axially with said outer shell and within said outer shell, said cylinder being radially spaced from said outer shell, said cylinder extending downward from a vertically intermediate portion of said outer shell to an area proximate said seal retainer;

a base valve connected to an upper end portion of said cylinder, said base valve comprising a first damping port, a first return port and a first communication path formed therein;

a rod guide connected to a lower end portion of said cylinder and positioned on an upper side of said seal retainer, said rod guide comprising a second communication path formed therein;

a piston slidably housed in said cylinder, said piston comprising a second damping port and a second return port formed therein;

a piston-rod connected to said piston, said piston-rod extending downward from said piston and slidably penetrating said rod guide and said seal retainer; and a seal supported by said seal retainer, said seal being disposed between said piston-rod and said seal retainer;

said outer shell and said base valve defining a first chamber, an upper portion of said first chamber being filled with gas and a lower portion of said first chamber being filled with liquid, said first chamber constituting a main chamber of a reservoir chamber, said cylinder, said base valve and said piston defining a second chamber, which is filled with liquid, said second chamber being fluidly connected to said first chamber via said first damping port and said first return port, said cylinder, said piston and said rod guide defining a third chamber which is filled with liquid, said third chamber being fluidly connected to said second chamber via said second damping port and said second return port, said outer shell, said cylinder, said base valve and said rod guide defining a fourth chamber which is filled with liquid, said fourth chamber being fluidly connected to said first chamber via said first communication path, said fourth chamber constituting a sub-chamber of said reservoir chamber, said cylinder separating said fourth chamber from said second and third chambers, said rod guide and said seal retainer defining a fifth chamber which is filled with liquid, said fifth chamber being fluidly connected to said first chamber via said first communication path, said fifth chamber further being fluidly connected to said fourth chamber via said second communication path, said rod guide separating said fifth chamber from said third chamber and said seal is exposed to said fifth chamber.

2. The twin-tube type shock absorber according to claim 1 wherein said liquid is provided in a quantity sufficient to ensure that the level of said liquid is above the upper surface of said base valve even when the shock absorber is fully extended.

3. The twin-tube type shock absorber according to claim 1 wherein the pressure of the gas filled in the upper portion of said first chamber is less than 20 kg/cm$^2$.

4. The twin-tube type shock absorber according to claim 1, further comprising a free piston which is housed in said first chamber so as to be slidable with said outer shell such that said free piston separates said gas from said liquid in said first chamber.

5. The twin-tube type shock absorber according to claim 1, further comprising:

a valve guide extending on along an axis of the shock absorber and extending through a center hole formed in said base valve, a screw being formed on an upper portion of said valve guide, a lower portion of said valve guide being radially expanded, a lowermost portion of the expanded portion extending radially outward and forming a first flange portion, an upper surface of said expanded portion contacting a lower surface of a radially inner portion of said base valve;

a base valve nut being fixedly threaded onto said screw formed on said upper portion of said valve guide, an uppermost portion of said base valve nut being radially expanded and forming a second flange portion;

a first leaf valve constructed of an annular elastic plate, said first leaf valve being disposed on an upper side of said base valve, a radially inner portion of said first leaf valve being squeezed between said base valve and said base valve nut, a radially outer portion of said first leaf valve detachably contacting an upper surface of said base valve so as to close or open said first damping port by elastic deformation of said first leaf valve;

a first leaf seat constructed of an annular plate, said first leaf seat being disposed on an upper side of said first leaf valve so as to support a radially intermediate portion of said first leaf valve from the upper side of the first leaf valve, said first leaf seat being disposed radially outside a lower portion of said base valve nut so as to be slidable with respect to the lower portion of said base valve nut;

a first spring seat constructed of an annular member with a L-shaped cross section, said first spring seat being disposed on an upper side of said first leaf seat so as to contact an upper surface of said first leaf seat and so as to push said first leaf seat downward, said first spring seat being disposed radially outside said lower portion of said base valve nut so as to be slidable with respect to the lower portion of said base valve nut;

a first compression spring interposed between said first spring seat and said second flange portion of said base valve nut, said first compression spring biassing said first spring seat downward;

a first non-return valve constructed of an annular plate, said first non-return valve being disposed on a lower side of said base valve, said first non-return valve being disposed radially outside said expanded portion of said valve guide so as to be slidable with respect to the expanded portion of said valve guide and detachably contacting the lower surface of said base valve; and a second compression spring consisting of a conical spring, said second compression spring being disposed between said first non-return valve and said first flange portion of said valve guide, said first non-return valve being slidable with respect to said expanded portion of said valve guide so as to open or close said first return port by compression of said second compression spring.

6. The twin-tube type shock absorber according to claim 1, wherein said piston-rod has a step portion, a first portion of said piston-rod above said step portion having a diameter which is smaller than a diameter of a second portion of said piston-rod which is below said step portion, said first portion of said piston-rod extending through a center hole formed in said piston, a screw being formed on an upper portion of said first portion of said piston-rod.

7. The twin-tube type shock absorber according to claim 6, further comprising:

a piston nut fixedly threaded onto said screw formed on said upper portion of said first portion of said piston-rod, an uppermost portion of said piston nut being radially expanded and forming a third flange portion;

a second leaf valve constructed of an annular elastic plate, said second leaf valve being disposed on an upper side of said piston, a radially inner portion of said second leaf valve being squeezed between said piston and said piston nut, a radially outer portion of said second leaf valve detachably contacting an upper surface of said piston so as to close or open said second damping port by elastic deformation of said second leaf valve;

a second leaf seat constructed of an annular plate, said second leaf seat being disposed on an upper side of said second leaf valve so as to support a radially intermediate portion of said second leaf valve from the upper side of the second leaf valve, said second leaf seat being disposed radially outside a lower portion of said piston nut so as to be slidable with respect to the lower portion of said piston nut;

a second spring seat constructed of an annular member with a L-shaped cross section, said second spring seat being disposed on an upper side of said second leaf seat so as to contact an upper surface of said second leaf seat and so as to push said second leaf seat downward, said second spring seat being disposed radially outside said lower portion of said piston nut so as to be slidable with respect to the lower portion of said piston nut;

a third compression spring interposed between said second spring seat and said third flange portion of said piston nut, said third compression spring biassing said second spring seat downward;

a second non-return valve constructed of an annular elastic plate, said second non-return valve being disposed on a lower side of said piston, said second non-return valve being disposed radially outside said first portion of said piston-rod and detachably contacting a lower surface of said piston, said second non-return valve being elastically deformable so as to open or close said second return port;

a third leaf seat constructed of an annular plate, said third leaf seat being disposed on a lower side of said second non-return valve so as to support a radially inner portion of said second non-return valve from the lower side of the second non-return valve, said third leaf seat being disposed radially outside said first portion of said piston-rod;

a non-return valve stopper constructed of an annular plate, a radially inner portion of said non-return valve stopper, said third leaf seat and a radially inner portion of said second non-return valve being squeezed between a radially inner portion of said piston and said step portion of said piston-rod; and a piston-ring fitted in a circumferential groove formed in a radially outer portion of said piston, said piston-ring slidably contacting an inside surface of said cylinder.

8. The twin-tube type shock absorber according to claim 1, wherein said rod guide comprises a rod guide main body having a center hole formed in said rod guide main body, a cylindrical guide bush fixedly fitted in said center hole of said rod guide main body, said piston-rod slidably contacting an inside surface of said guide bush, said cylinder being fixedly connected to a step-like shoulder formed in an upper and radially outer portion of said rod guide main body, said second communication path being obliquely formed in a radially outer portion of said rod guide main body so as to communicate said fourth chamber with said fifth chamber.

9. The twin-tube type shock absorber according to claim 1, wherein a step-like groove is formed in a lower and radially outer portion of said rod guide and a fixed sealing member is inserted in a space defined by said rod guide, said seal retainer and said outer shell.

* * * * *